US006937743B2

(12) United States Patent
Rizzotti et al.

(10) Patent No.: US 6,937,743 B2
(45) Date of Patent: Aug. 30, 2005

(54) PROCESS AND DEVICE FOR DETECTING FIRES BASED ON IMAGE ANALYSIS

(75) Inventors: Didier Rizzotti, Puidoux (CH); Nikolaus Schibli, Lausanne (CH); Werner Straumann, Fribourg (CH)

(73) Assignees: Securiton, AG, Zollikofen (CH); Fastcom Technology SA, Lausanne (CH)

(*) Notice: Subject to any disclaimer, the term of this patent is extended or adjusted under 35 U.S.C. 154(b) by 18 days.

(21) Appl. No.: 10/647,109

(22) Filed: Aug. 25, 2003

(65) Prior Publication Data

US 2004/0175040 A1 Sep. 9, 2004

Related U.S. Application Data

(63) Continuation of application No. PCT/CH02/00118, filed on Feb. 26, 2002.

(30) Foreign Application Priority Data

Feb. 26, 2001 (CH) .............................................. 0340/01

(51) Int. Cl.[7] ................................................ G06K 9/00
(52) U.S. Cl. ........................ 382/100; 382/191; 340/578
(58) Field of Search ................................ 382/100, 103, 382/162, 165, 191, 286; 348/82, 143, 144, 159, 161; 340/577, 578; 250/339.15; 356/438

(56) References Cited

U.S. PATENT DOCUMENTS

| | | | | | |
|---|---|---|---|---|---|
| 4,614,968 | A | * | 9/1986 | Rattman et al. | 358/93 |
| 5,153,722 | A | * | 10/1992 | Goedeke et al. | 358/108 |
| 5,237,308 | A | * | 8/1993 | Nakamura | 340/588 |
| 5,289,275 | A | | 2/1994 | Ishii et al. | 348/154 |
| 5,625,342 | A | | 4/1997 | Hall et al. | 340/578 |
| 5,937,077 | A | * | 8/1999 | Chan et al. | 382/100 |
| 6,184,792 | B1 | * | 2/2001 | Privalov et al. | 340/578 |
| 6,597,799 | B1 | * | 7/2003 | Pfaff et al. | 382/100 |
| 2002/0021221 | A1 | * | 2/2002 | Okamoto et al. | 340/577 |
| 2002/0030608 | A1 | | 3/2002 | Boucourt | 340/945 |
| 2003/0038877 | A1 | * | 2/2003 | Pfefferseder et al. | 348/82 |
| 2003/0044042 | A1 | * | 3/2003 | King et al. | 382/100 |
| 2003/0141980 | A1 | * | 7/2003 | Moore et al. | 340/578 |

FOREIGN PATENT DOCUMENTS

| | | | | |
|---|---|---|---|---|
| EP | 0 818 766 | A1 | 1/1998 | G08B/17/12 |
| FR | 2696939 | A1 | 4/1994 | A62C/3/02 |
| FR | 2 775 534 | A1 | 9/1999 | G08B/23/00 |
| WO | WO 97/16926 | A1 | 5/1997 | G08B/13/194 |
| WO | WO 00/23959 | A1 | 4/2000 | H04N/7/18 |

* cited by examiner

*Primary Examiner*—Andrew W. Johns
(74) *Attorney, Agent, or Firm*—Blank Rome LP

(57) ABSTRACT

Method for automatically detecting fires, based on flame and/or smoke recognition by analyzing a sequence of images. The analysis is based on several image processing algorithms. One algorithm consists in comparing the frequency content of at least an image of said sequence with the frequency content of a reference image so as to detect an attenuation of high frequencies independently of variations on other portions of the spectrum.

26 Claims, 3 Drawing Sheets

PROCESS AND DEVICE FOR DETECTING FIRES BASED ON IMAGE ANALYSIS

RELATED APPLICATIONS

This application is a continuation based on PCT/CH02/00118, filed on Feb. 26, 2002, which claims priority of Swiss application CH0340/01, filed on Feb. 26, 2001, both of which are hereby incorporated by reference.

FIELD OF THE INVENTION

The present invention concerns a method and device or a system for detecting fires based on image analysis, in particular by analyzing sequences of digital animated images.

BACKGROUND OF THE INVENTION

In the field of surveillance and security of industrial sites or lengths of roads or tunnels, the speed of fire detection constitutes a predominant security factor. In particular, it is necessary to be able to detect the start of a fire as quickly as possible in order to be able to fight it efficiently and to take measures to limit the extent of the blaze. For cost reasons, it is however generally impossible to employ human surveillance continuously. Automatic surveillance and detection systems are thus highly desirable.

Different systems have already been proposed or commercialized in order to detect fires or smoke.

Most of the currently used systems make use of punctual smoke sensors that must wait until the smoke propagates up to them to have a chance of detecting it. These sensors are unusable outside (refineries, storage of containers, etc.), on large premises in which the smoke disperses and takes a long time to reach the sensor (hangars, nuclear power station, etc.) or on premises with strong air draughts (tunnels, strongly ventilated rooms, etc.). The sensors must be sufficiently near and wired; the cost of wiring a large number of sensors can however prove prohibitive. These solutions are thus poorly suited for the surveillance of large volumes or ranges.

Other known systems are based either on measuring the temperature increase in the room, or on measuring the received quantity of UV or infrared radiation.

Systems using the temperature-increase principle are relatively slow (temperature lag) and do not function reliably outside or on large premises. Systems based on measuring UV radiation function in any environment but quickly loose their efficiency when the sensor is soiled, without this being detectable.

Systems based on measuring infrared radiation function in any environment but generate false alarms when they are in the presence of a hot object or when they are exposed to solar radiation.

More recently, it has been suggested to detect fires with the aid of methods based on image analysis. Many potentially dangerous sites are already equipped with surveillance cameras connected to a central fire alarm system and used for example to detect breaking-ins or accidents. Use of these surveillance systems for also detecting fires makes it possible to save the costs of installing and connecting a separate system of sensors. Automatic image analysis solutions, using already installed video cameras and software for processing the video signals supplied by the cameras, have also been suggested.

Smoke detection by image analysis has the following advantages over the solutions using punctual sensors:

- The camera can detect smoke and flames at a distance, before they even reach the sensor, therefore such a system is capable of avoiding the deficiencies of the traditional systems outside or on large premises.
- The images taken by the camera can not only be processed, but also used for visualizing the incident by an operator. This is useful in order to remove any doubts in the case of false alarms: visualizing the image or image sequence by a human allows many unnecessary trips to be avoided.
- The images taken make it possible also to give a better idea of the magnitude of the blaze as well as of the type of fire. It is thus possible to immediately prepare the correct intervention material and to thus save precious minutes.
- A soiling of the sensor (camera) is visible on the image and, according to the invention, can even be detected automatically, contrary to the UV radiation sensors that lose their efficiency without this being detectable.
- Malfunction or sabotage of the camera is detectable automatically.
- The camera used for detecting fires is usable simultaneously for classical surveillance applications, which allows the wiring to be simplified.

Systems for detecting fires by analyzing video images have already been described in the prior art. WO00/23959 describes a system for detecting smoke, consisting of a video camera equipment, a unit for digitizing video signals and a unit for processing digital data. The smoke is detected by image processing algorithms based on comparing the pixels between successive images. The comparison methods used aim for example to detect if an important change has occurred between an image and a reference image that could indicate the appearing of smoke but also of any other object within the filmed visual field. Another algorithm detects the convergence of color of several pixels towards an average value, capable of indicating a drop in contrast caused by smoke. Such a convergence can also indicate a change in the lighting conditions. A third algorithm measures the changes in the sharpness of the transition zones, affected by smoke but also by optic characteristics that are modified for example during zooms or changes of aperture. These methods are uniquely adapted to detecting smoke but not flames emitting little or no smoke. The algorithms employed are complex and require considerable processing power.

WO97/16926 describes a method for detecting changes in an image sequence in order to detect events. The method of detection is based on taking a reference image that contains the background information of the recorded scene. The appearing of new objects is detected by thresholding and pixel grouping methods. The algorithms employed are poorly suited to distinguish between the appearing of smoke or of any other object in the filmed visual field.

EP0818766 describes a system for detecting forest fires by processing animated images. To detect the fire, a smoke detection algorithm is used. This document describes a method for detecting temporal variations of the pixels' intensity at low frequency (between 0.3 and 0.1 Hz). The system is thus fairly slow to react since many cycles of several tenths of seconds are necessary to detect a de-correlation that could indicate the presence of smoke.

FR-A-2696939 describes a system for automatically detecting forest fires by image processing. Processing algorithms are based on the detection and analysis of the movements of volutes and clouds of smoke; they are however poorly adapted for detecting flames or smoke that develop in unusual ways, for example under the effect of wind or of a ventilation.

The existing systems for detecting fire by analysis of video images are well suited for detecting particular types of fire in well-defined environments. A firm wishing to specialize in the surveillance of fires in different sites must however acquire and become acquainted with different software programs; there is at the present time no solution sufficiently robust and polyvalent that allows the detection of very different fires by means of the same software.

SUMMARY OF THE INVENTION

One aim of the present invention is thus to propose a method and a device for detecting fire that are more reliable, faster and more polyvalent than the methods and systems of the prior art.

Another aim is to propose a method and a system for detecting fire that can be used by means of a video surveillance system already installed on the site to be watched.

BRIEF DESCRIPTION OF THE FIGURES

The invention will be better understood by reading the description given by way of example and illustrated by the figures, in which.

DETAILED DESCRIPTION OF THE PREFERRED EMBODIMENT(S)

Figure 1:
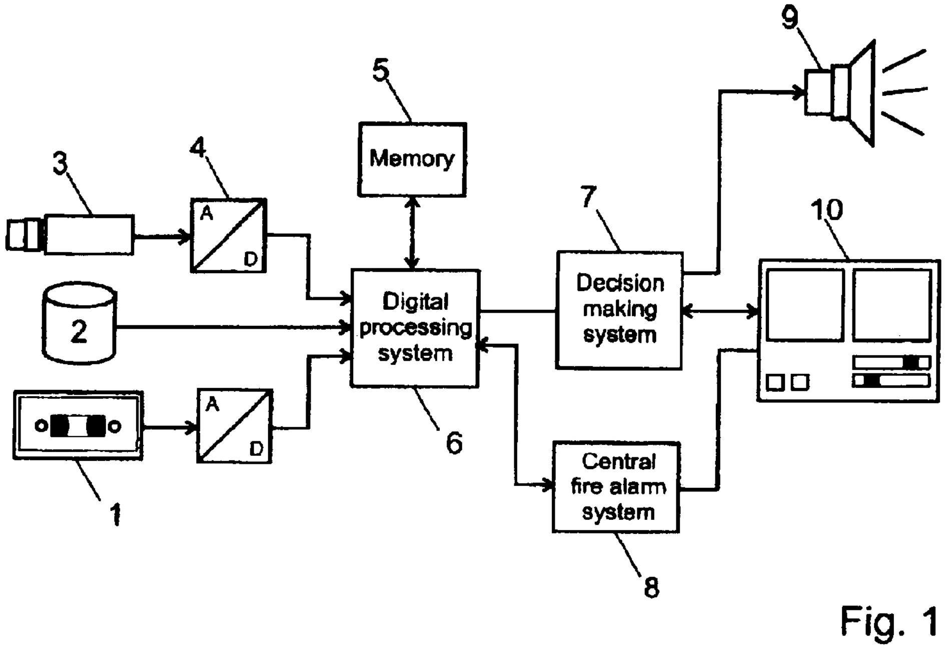
FIG. 1 shows a block diagram of the automatic fire detection system allowing the method of the invention to be used.

FIG. 1 shows a block diagram of an automatic fire detection system allowing the method of the invention to be used. The illustrated system allows images to be acquired from different sources, for example a video camera PAL or NTSC 3, a digital video camera, a recording carrier such as a hard drive 2 or optical disk or video tape 1. The sequences of images are digitized if necessary by a digitizer 4 and transmitted to a digital processing system 6, for example an industrial PC, which executes the flame and smoke detection algorithms described further below. The digitizer 4 is constituted for example by a card digitizing the video sequences coming from the camera or the video recorder inserted in the digital processing system 6. Certain algorithms can use one or several reference images or sequences of images, for example a view of the image's background without fire, in a memory 5.

The results of the detection algorithms can be displayed locally on the screen of the digital processing system 6 or processed by a result-interpretation and decision-making system 7 capable of generating fire or smoke alarms or pre-alarms when certain predefined conditions are fulfilled. This alarm can be transmitted to a central fire alarm system 8, to an apparatus 9 generating an acoustic alarm and/or to an operator through a graphical interface 10 on one of the systems 7 or 8. The central fire alarm system manages all the alarms coming from the result-interpretation and decision making system. The system 7 can be used by an industrial computer close to the zone under surveillance or by a program or set of programs executed by the digital processing system 6. The central fire alarm system can be situated at a distance and generate alarms coming from different sites under surveillance.

Figure 2:
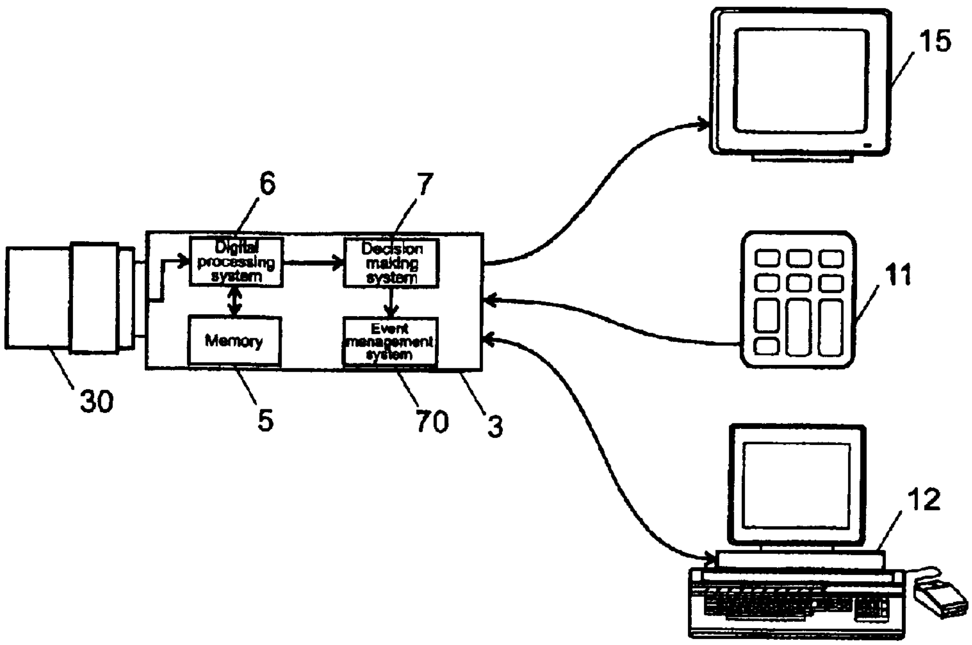
FIG. 2 shows a block diagram of a variant embodiment of the automatic fire detection system allowing the method of the invention to be used, in which different elements are integrated in an intelligent video camera.

FIG. 2 illustrates a variant embodiment of the system enabling the invention to be used, in which most of the elements of FIG. 1 are integrated in a single intelligent camera 3, i.e. a camera integrating digital image processing means. The camera integrates an optic 30, an image sensor (not represented), for example a random access sensor, and an image-acquisition and digital processing system 6 to acquire the camera's image sequences in digital form and to execute on these sequences of images the different flame and smoke detection algorithms described further below. The intelligent camera 3 further integrates a memory 5 to store these algorithms as well as one or several reference images or sequences of images used by these algorithms. A result-interpretation and decision-making system 7 can be realized for example in the form of a computer module loaded in the memory 5 and executed by the digital processing system 6. The intelligent camera 3 can further integrate an event management system 70 to manage the events detected by the system 7 and trigger for example the sending of an alarm or of a pre-alarm. The intelligent camera 3 can be connected through a communication interface to a screen 15 to visualize either image sequences acquired live or recorded images corresponding to one of the detected events. The camera 3 is also capable of communicating its results to a computer 12. A control unit 11 enables to select interest zones in an image, to vary the sensitivity of the detection, to program movements of the camera, etc. The camera 3 thus constitutes a complete intelligent camera system capable of detecting flames and smoke and to generate alert signals accordingly.

Figure 3:
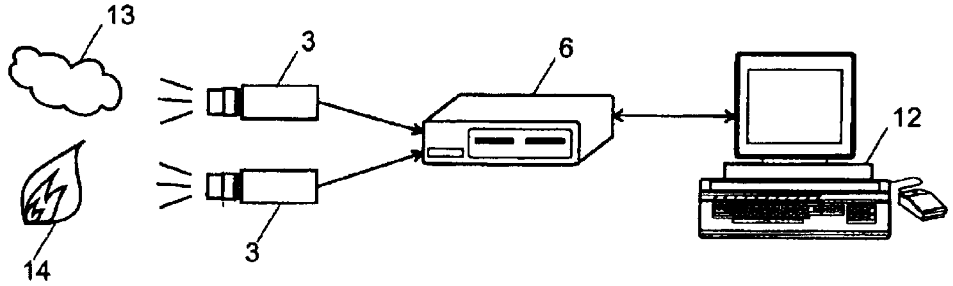
FIG. 3 shows a block diagram of a variant embodiment of the automatic fire detection system comprising several cameras connected to a computer through a processing unit.
Figure 4:
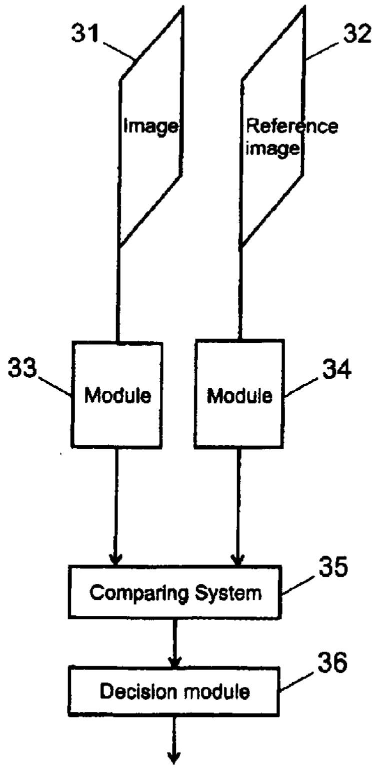
FIG. 4 shows a diagrammatic representation of a frequency analysis algorithm for smoke detection.

FIG. 3 illustrates another variant embodiment of the system allowing the invention to be used, wherein one or several video cameras 3 for detecting smoke 13 or flames 14 supply image sequences directly processed by the digital image processing system 6, for example an industrial PC on the site under surveillance. The system 6 executes the smoke detection algorithms by image processing and result interpretation. The processed images and the detected events are transmitted to a remote operator provided with a computer 12 integrating a graphical interface allowing to visualize the video images coming from the cameras 3 and to inform the operator in case of alarm detection.

In order to make reliable decisions on the state of the site under surveillance, i.e. to reduce the number of false alarms or non-detected fires, the digital image processing system 6 and the result-interpretation and decision-making system 7 use several image processing algorithms that are distinct and combined with one another. The used algorithms can be based on the following methods:

1. Frequency Analysis of the Current Image and of the Reference Image with a Comparison of the Results The presence of smoke reduces the sharpness of the outlines of the objects present in the scene, which corresponds to a low-pass spatial smoothing filter. The high frequencies of the image 31 are thus attenuated by the presence of smoke relatively to the reference image 32 stored in the memory 5 and corresponding for example to an image of the background without smoke nor flames. The method thus consists in computing the frequency transform of each image 31 or portion of the image acquired by means of a module 33 of fast Fourier transform FFT or FHT for example, and to compare it with the aid of a comparing system 35 to the frequency transform of the reference image 32 computed by a module 34. When the comparing system detects an attenuation of the high frequencies of the image that is greater than the attenuation of the low frequencies relatively to the reference image, a decision module 36 can indicate a smoke alarm or the probability of a smoke alarm.

This algorithm can be used on the whole image. In order to detect the appearing of smoke more clearly and faster, this algorithm is preferably applied on one or several sub-portions or zones of the filmed image, an alarm being set off as soon as one or a minimum number of zones indicate an attenuation of the high spatial frequencies relatively to the reference image. It is also possible to apply this algorithm only on the portions of the image onto which smoke is likely to appear or onto which another algorithm has indicated a probability of a fire event. Finally, this algorithm can be applied either onto an image in a shade of gray or of another component, or separately on the different components of a color image. According to the smoke colors likely to appear, it is possible to weight differently the different chromatic components.

2. Frequency Analysis between Consecutive Images for Detecting Flame Oscillations The appearing of an object whose outlines, chrominance or luminosity oscillate at a frequency higher than 0.5 Hz is a sign indicating the possible presence of flames. This can be detected by means of a frequency analysis method using successive images of a sequence of images. In order to perform this analysis, the computer must have the whole image sequence in its memory and detect in the spatial field objects by means of a shape recognition algorithm.

This algorithm can also be used to detect and track, over several successive images, objects whose shape, size and/or color vary irregularly and according to a random frequency. Object identification and tracking methods can be used.

3. Analysis of the Information on the Color Saturation to Detect Smoke

When a sequence of color images is available, it is possible to use the color information directly as criteria indicating the presence of smoke. Smoke is indeed generally rather colorless (white, black, gray, etc.). An image or an image portion that becomes less colored is thus likely to indicate smoke. According to the colors of smoke that are likely to appear, it is possible to take this color into account.

Inversely, an image portion that suddenly becomes more colored and luminous could represent flames, a fortiori if this portion is located on the bottom of the image or under a portion that could represent smoke.

4. Analysis of the Color Temperatures

When a sequence of color images is available, it is possible to approximate the emission spectrum of an object on each image by measuring the red, green and blue components, which allows an approximation of the temperature of an object. An object with a strong luminosity having an emission spectrum corresponding to a hot body with maxima in the reds-yellows can be suspected of being a flame (or the reflection of a flame).

5. Detection of the Disappearing of Straight Segments (lines) in the Current Image The appearing of an object whose outlines have only few straight segments is a sign indicating the possible presence of smoke or flames. If a comparison is made with the reference image, the disappearance of straight segments can be detected.

6. Analysis of the Differences between the Current Image and a Reference Image for Detecting Zones of Interest By measuring the differences between the currently filmed image and a reference image of the same scene, it is possible to detect reliably the appearing of objects that were not present in the reference image. This algorithm makes it possible to identify the zones where the probability of smoke appearing is greater. The other algorithms for detecting flames or smoke can concentrate on this zone. In order to avoid that changes in light or shadows are detected as being new objects, it is possible to regularly renew the reference image.

7. Analysis of Several Image Sequences of the Same Scene from Several Different Shooting Angles (stereo analysis)

When several images of the same scene from different shooting angles are available, it is possible to use stereoscopic vision algorithms to evaluate the position, the tridimensional shape, the volume and the distance of filmed objects, for example of new objects appearing relatively to a reference image. It is thus possible to distinguish for example between a column of smoke appearing in front of a wall and a shade or reflection on this wall. Outdoors, this algorithm enables to distinguish between a new cloud and a much closer column of smoke. This algorithm can be used for example to identify very reliably the interest zones of an image or of a sequence of images on which the other algorithms are then to concentrate.

Multiple image sequences can be generated for example by means of several cameras, by means of a single motorized camera allowing the position or shooting angle to be modified, by means of one or several cameras and a set of mirrors, etc.

8. Alarms Supplied by External Sensors

The digital processing system 6 can further be connected to one or several external sensors that may be present and that allow specific events to be detected, for example temperature sensors, infrared or ultraviolet sensors, movement sensors, etc. The indications supplied by these sensors are transmitted to acquisition cards in the digital processing system 6 and can be used to confirm the indications supplied by the image processing algorithms or to improve the performance of these algorithms. For example, a movement sensor can be used to trigger an optical or digital displacement or a zoom movement of a camera towards the zone where the movement occurred, or to concentrate the image processing algorithms on the portions of the image corresponding to the zone where the movement was detected.

The results of the different algorithms are combined with one another by a process of result interpretation and decision-making executed for example by the system 7 in order to detect the flames and/or the smoke reliably. This result interpretation process can take into account the evolution of the different criteria of detection as a function of time. For example, a detection level that increases rapidly is more dangerous than a stable detection level.

As previously mentioned, it is possible to improve considerably the performance of the system by segmenting the image into several portions and by adapting the detection sensitivity of the different algorithms according to these different portions. The portions of the image likely to cause false alarm problems (chimneys in a landscape, portion of a wall into which the headlights of cars are reflected, etc.) can thus be desensitized without influence on the detection in the other parts of the image. It is also possible to make more sensitive the parts that are furthest away from the scene and less sensitive the parts that are closest, in order to compensate the effect of perspective. This adaptation can be performed manually or automatically.

According to the invention, the sensitivity can be modified to adapt the system to its environment. In a preferred embodiment, this adjustment can be made by means of a unique parameter influencing all the algorithms of the system. This parameter can be modified through a sliding button on the graphical interface 10, of a potentiometer, or through any other adjusting element.

Figure 5:
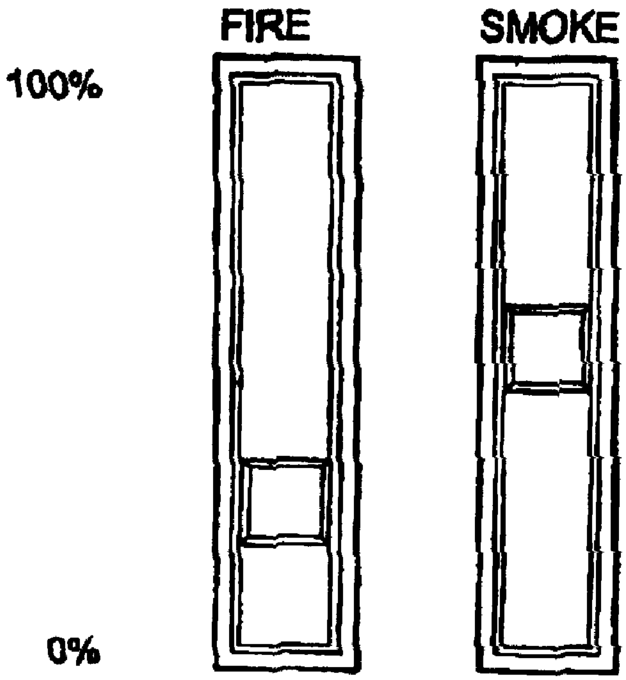
FIG. 5 shows a representation of sliding buttons of a graphical interface allowing the sensitivity to the detection of flames and of smoke to be regulated separately.

When the fire detection program is intended to be used in very different environments, for example if the same program is used to detect forest fires in a landscape or fires in a road tunnel, it is desirable to be able to adjust separately the sensitivity of the flame detection algorithms and of the smoke detection algorithms. FIG. 5 illustrates two sliding buttons allowing the flame detection and the smoke detection to be adjusted separately.

The one skilled in the art will understand that it is easily possible, within the framework of the invention, to image an advanced parametrization mode allowing the sensitivity of each algorithm, the sensitivity applied on each zone or on each color component etc. to be adjusted separately. It is thus possible to use the same device and a same fire detection program and to parameter it to detect flames or smoke in very different environments, for example in a road or rail tunnel, outside, in hangars, etc.

The different events likely to occur in the system are presented to the use by the graphical interface 10 in order of urgency. The graphical interface thus displays for example at the top of the list the flame and smoke alarms by listing the most recent alarm, then the flame and smoke pre-alarms, starting also here with the most recent pre-alarm, the other events or alarms possibly detected being displayed at the bottom of the list. These other events can comprise for example camera failures, soiled cameras, indications as to insufficient luminosity of the scene to be watched, or external events detected by sensors (not represented), such as unhooking of the fire extinguishers, opening of doors, etc. A visual message, preferably a pop-up window indicating the type of detected alarm and opening in a graphical interface 10, and a sound beep are preferably generated when an alarm is detected.

These different events can be stored in a log file in the processing system 6, in the system 7 or in the computer used by the remote operator and listing all the events that have occurred. This file is preferably constituted by a XML document containing also images or image sequences linked to each listed event, as well as the date of the event. An operator can thus consult the XML file corresponding to the surveillance period and load the recorded images, for example remotely, to check the detected alarms and make sure for example that the detected alarms do indeed correspond to fires.

The present invention concerns a fire detection method. It also concerns a device specially adapted to implement this method, for example a computer or an intelligent camera, programmed to implement this method, as well as a data carrier comprising a computer program directly loadable into the memory of such a device and comprising computer code portions constituting means for executing the method.

What is claimed is:

1. An automatic fire detection method, based on the recognition of flames and/or smoke from the analysis of a sequence of images, the analysis being based on several image processing algorithms, an algorithm comprising a step of comparing the frequency content of at least one image of said sequence with the frequency contents of a reference image in order to detect an attenuation of the high frequencies independently of the variations on the other portions of the image's spatial spectrum.

2. The method of claim 1, further comprising a step of adjusting the detection sensitivity of at least one of said algorithms can be adjusted through a graphical interface independently of the system's global sensitivity.

3. The method of claim 1, wherein said comparison is performed only in one or several portions of said image.

4. The method of claim 3, further comprising a step of dividing said image into several zones, said comparison being performed between at least one zone of said reference image and at least one comparable zone of at least one image of said sequence.

5. The method of claim 1, wherein the frequency contents of at least two chromatic components of said images of said sequence and of said reference image are calculated and used separately for said comparison.

6. The method of claim 1, wherein at least one said image processing algorithm is a smoke detection algorithm by measuring the saturation of colors in at least one portion of said images.

7. The method of claim 1, wherein at least one said image processing algorithm is an algorithm for detecting the disappearance of straight segments in at least one portion of said images.

8. The method of claim 1, wherein at least one said image processing algorithm is an algorithm for detecting flames.

9. The method of claim 8, wherein one said flame detection algorithm consists in analyzing the variations between consecutive images in order to detect objects whose outline oscillate with a frequency greater than 0.5 Hz.

10. The method of claim 8, wherein one said flame detection algorithm consists in identifying objects whose shape and color vary in a non-regular manner.

11. The method of claim 8, wherein one said flame detection algorithm consists in evaluating the color temperatures in at least a portion of said images in order to detect the presence of flames.

12. The method of claim 1, wherein at least one said image processing algorithm uses several image sequences representing the same view at different angles.

13. The method of claim 12, wherein said algorithm using several image sequences allows to supply information on the distance, the shape and/or the volume of the flames and of the smoke.

14. The method of claim 1, wherein at least one said image processing algorithm is an algorithm allowing the presence of a new object in a portion of the image to be detected.

15. The method of claim 14, wherein at least one flame or smoke detection algorithm is used in order to analyze in more detail the portion of the image where a new object has appeared.

16. The method of claim 1, wherein the temporal evolution of the results supplied by at least one of said algorithms is taken into account in the flame or smoke detection.

17. The method of claim 1, implemented by means of at least one video camera and a video digitization device connected to a computer in order to perform all the detection algorithms, and equipped with visualization means for a human operator.

18. The method of claim 1, implemented by a digital camera integrating the optic, the image sensor, the image digitization device, the processor for executing all the detection algorithms and a communication interface for the detection results and/or visualization means for a human operator.

19. The method of claim 1, comprising a step of adjusting the sensitivity by means of an adjusting element allowing the flame detection sensitivity and the smoke detection sensitivity to be selected independently.

20. The method of claim 1, comprising a step of adjusting the sensitivity by means of an adjusting element allowing the detection sensitivity at each algorithm to be chosen independently from a plurality of used algorithms.

21. A device for processing digital images adapted to receive sequences of digital images coming from at least one video camera and comprising a computer program capable of executing the method of claim 1.

22. The device of claim 21, comprising visualization means for a human operator allowing said sequences of digital images to be visualized.

23. The device of claim 22, comprising alarm-generating means in order to generate an alarm displayed on said visualization means as soon as a fire has been detected, and means allowing a human operator to confirm or invalidate the presence of fire by visualizing said images.

24. A data carrier comprising a computer program directly loadable in the memory of a digital processing device and comprising computer code portions constituting means for executing the method of claim 1.

25. An automatic fire detection method, based on the recognition of flames and/or smoke from the analysis of a sequence of images, the analysis being based on at least three different image processing algorithms selected among the following algorithms:

a first algorithm comprising a step of comparing the frequency content of at least one image of said sequence with the frequency contents of a reference image in order to detect an attenuation of the high frequencies independently of the variations on the other portions of the image's spatial spectrum; and/or a second algorithm comprising a step of detecting smoke by measuring the saturation of colors in at least one portion of said images; and/or a third algorithm comprising a step of detecting the disappearance of straight segments in at least one portion of said images; and/or a fourth algorithm comprising a step of analyzing the variations between consecutive images in order to detect objects whose outline oscillate with a frequency greater than 0.5 Hz; and/or a fifth algorithm comprising a step of identifying objects whose shape and/or color vary in a non-regular manner; and/or a sixth algorithm comprising a step of evaluating the color temperatures in at least a portion of said images in order to detect the presence of flames; and/or a seventh algorithm comprising a step of using several image sequences representing the same view at different angles; and/or an eighth algorithm comprising a step of detecting the presence of a new object in a portion of the image.

26. The method of claim 25, the analysis being based on at least four different image processing algorithms selected among said algorithms.

* * * * *